United States Patent
Lin et al.

(10) Patent No.: US 11,892,672 B2
(45) Date of Patent: Feb. 6, 2024

(54) DISPLAY DEVICE WITH LIGHT GUIDE PLATE HAVING ANGLED ECCENTRIC MICROSTRUCTURES

(71) Applicant: TPK TOUCH SOLUTIONS (XIAMEN) INC., Xiamen (CN)

(72) Inventors: Ming-Chuan Lin, Taichung (TW); Sheh-Jung Lai, Taichung (TW); Kuo-Hsin Wang, Nantou County (TW); Yu-Ling Chen, Taichung (TW)

(73) Assignee: TPK TOUCH SOLUTIONS (XIAMEN) INC., Xiamen (CN)

( * ) Notice: Subject to any disclaimer, the term of this patent is extended or adjusted under 35 U.S.C. 154(b) by 0 days.

(21) Appl. No.: 17/749,161

(22) Filed: May 20, 2022

(65) Prior Publication Data

US 2023/0375768 A1    Nov. 23, 2023

(51) Int. Cl.
  *G02B 6/00*   (2006.01)
  *F21V 8/00*   (2006.01)

(52) U.S. Cl.
  CPC ......... *G02B 6/0036* (2013.01); *G02B 6/0068* (2013.01)

(58) Field of Classification Search
  CPC ................ G02B 6/0036; G02B 6/0078; G09F 2013/1813
  See application file for complete search history.

(56) References Cited

U.S. PATENT DOCUMENTS

| | | | | |
|---|---|---|---|---|
| 6,539,656 B2* | 4/2003 | Maas | ..................... | G02B 6/006 40/546 |
| 8,764,266 B2* | 7/2014 | Urtiga | ..................... | G09F 13/18 362/616 |
| 9,523,809 B2* | 12/2016 | Sakamoto | ............ | G02B 6/0078 |
| 9,903,996 B2* | 2/2018 | Fukui | ..................... | G02B 6/002 |
| 10,281,640 B2* | 5/2019 | Montgomery | ....... | G02B 6/0068 |
| 10,586,421 B2* | 3/2020 | Fujita | .................... | H05B 47/165 |
| 10,690,830 B2* | 6/2020 | Takagi | .................... | G02B 6/006 |
| 11,340,394 B2* | 5/2022 | Okuda | ................... | A63F 7/0058 |
| 11,428,862 B2* | 8/2022 | Kim | ........................ | G02B 5/02 |
| 11,656,473 B2* | 5/2023 | Takata | ................... | B60K 37/02 359/630 |

* cited by examiner

*Primary Examiner* — Ismael Negron
(74) *Attorney, Agent, or Firm* — Idea Intellectual Limited; Margaret A. Burke; Sam T. Yip

(57) ABSTRACT

A display device includes a light guide plate a first area, a plurality of first eccentric microstructures positioned in the first area with a first eccentric orientation, a second area arranged at one side of the first area, and second eccentric microstructures positioned in the second area with a second eccentric orientation. An angle between the first eccentric orientation and the second eccentric orientation is less than 90 degrees. First and second light sources are disposed on a first side of the light guide, and configured to project light towards a corresponding one of the first and second eccentric microstructures.

9 Claims, 10 Drawing Sheets

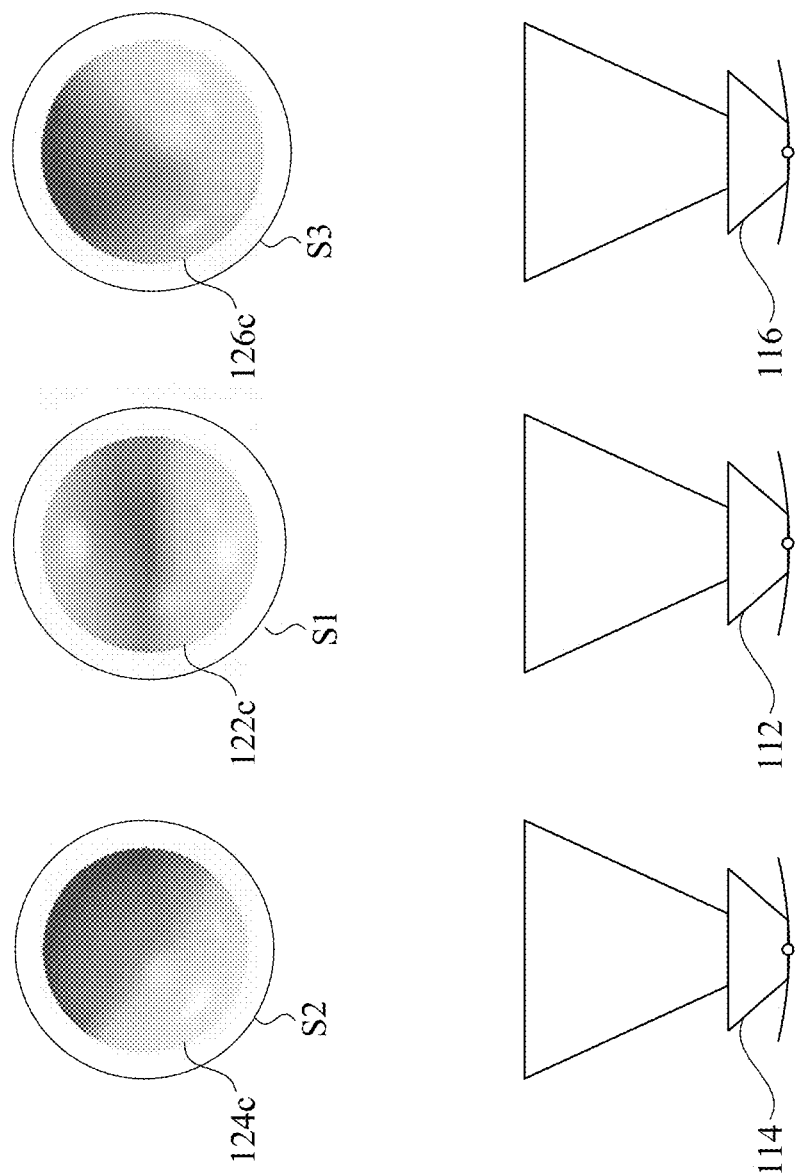

DISPLAY DEVICE WITH LIGHT GUIDE PLATE HAVING ANGLED ECCENTRIC MICROSTRUCTURES

BACKGROUND

Field of Invention

The disclosure relates to a display device, particularly to a display device including a light guide plate.

Description of Related Art

Display devices have been widely used in nowadays electronic products. As the demand for personal privacy increases, for example, if users intend to prevent wandering people from absorbing personal or confidential information, an optical adjustment film which is also called a privacy filter is usually placed over the display panel in a stationary (e.g., attached) or a detachable manner, to achieve privacy functions. However, if the privacy filter had been placed over the display panel in the stationary manner, it may lose its flexibility, and being not suitable for switching between a sharing mode and a privacy mode freely. If the privacy filter had been placed over the display panel in the detachable manner, additional structural components which fix the optical adjustment film to the display panel are needed, which may cause mechanical interference, inability to reduce weight and thickness, and has a negative effect on an appearance design of products. Therefore, a display device able to provide a wide-view mode and a privacy mode is a subject worthy of research and development in this field.

SUMMARY

The present disclosure utilizes the design for a backlight module to provide different angular fields of view, and further reduce light source setting surfaces to avoid occupying too much space in display device.

One embodiment of the present disclosure provides a display device. The display device includes a light guide plate. The light guide plate includes a first area and a second area located on at least one side of the first area. The light guide plate includes a substrate, a plurality of first eccentric microstructures and a plurality of second eccentric microstructures. The substrate is disposed on the first area and the second area. The first eccentric microstructures are disposed in the substrate, and the first eccentric microstructures are located at the first area. Each of the first eccentric microstructures comprises a first eccentric orientation. The second eccentric microstructures are disposed in the substrate, and the second eccentric microstructures are located at the second area. Each of the second eccentric microstructures comprises a second eccentric orientation. The first eccentric orientation is different from the second eccentric orientation. An angle between the first eccentric orientation and the second eccentric orientation is less than 90 degrees.

The other embodiment of the present disclosure provides a light guide plate. The light guide plate includes a substrate, a plurality of first eccentric microstructures and a plurality of second eccentric microstructures. The light guide plate has a first area and a second area, and the second area is located on at least one side of the first area. The first eccentric microstructures are disposed in the substrate, and the first eccentric microstructures are located at the first area. Each of the first eccentric microstructures comprises a first eccentric orientation. The second eccentric microstructures are disposed in the substrate, and the second eccentric microstructures are located at the second area. Each of the second eccentric microstructures comprises a second eccentric orientation. An angle between the first eccentric orientation and the second eccentric orientation is less than 90 degrees.

In summary, the light guide plate of the present disclosure includes eccentric microstructures with different eccentric orientations, in order to adjust the angular field of view, and, since an angle between the different eccentric orientations is less than 90 degrees, the light source can provide light from the same side of the light guide plate.

BRIEF DESCRIPTION OF THE DRAWINGS

FIG. 9 is a schematic diagram of eccentric microstructures in FIG. 2 in accordance with one embodiment of the present disclosure.

DETAILED DESCRIPTION

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present disclosure. Furthermore, for simplifying the diagrams, some of the conventional structures and elements are shown with schematic illustrations.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

In this document, the term "coupled" may also be termed "electrically coupled," and the term "connected" may be termed "electrically connected." "Coupled" and "connected" may also be used to indicate that two or more elements cooperate or interact with each other. In the following description and in the claims, the terms "include" and "comprise" are used in an open-ended fashion, and thus should be interpreted to mean "include, but not limited to." As used herein, the term "and/or" includes any and all combinations of one or more of the associated listed items.

Figure 1:
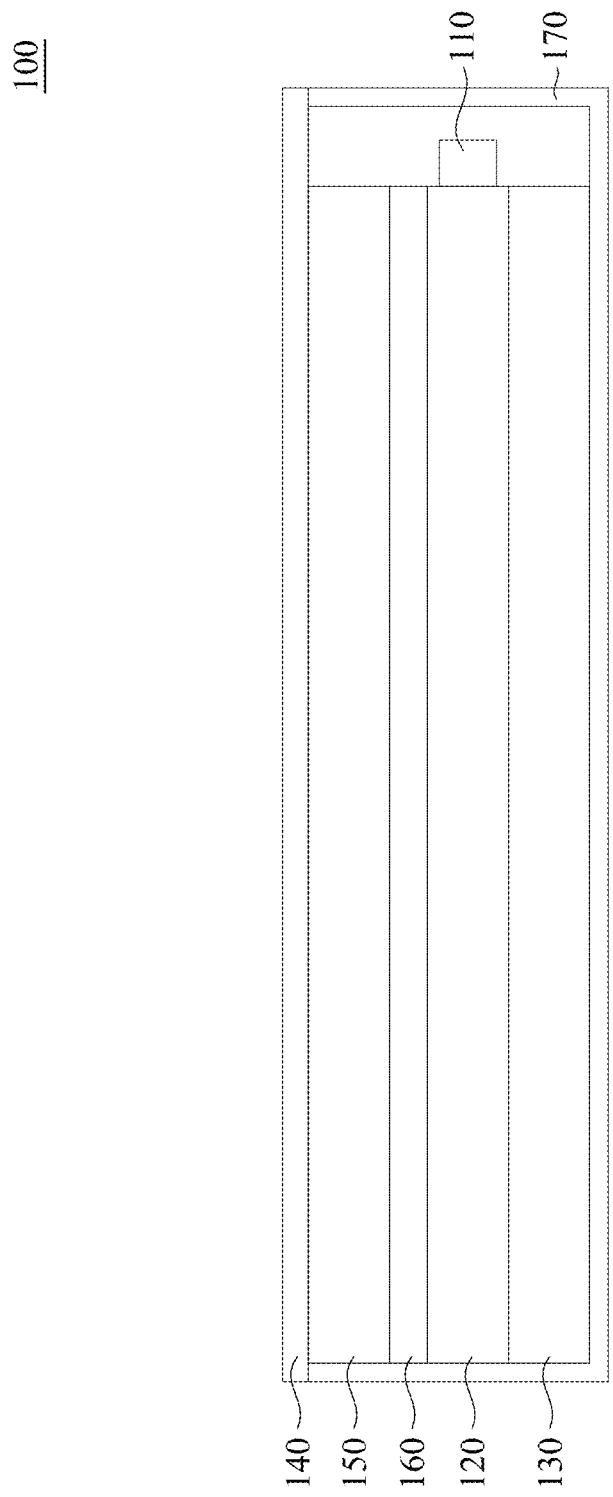
FIG. 1 is a side sectional view of a display device in accordance with one embodiment of the present disclosure.

A description is provided with reference to FIG. 1. FIG. 1 is a side sectional view of a display device 100 in accordance with one embodiment of the present disclosure. The display device 100 includes a liquid crystal display module 150, a light guide plate 120, a light source 110 and a reflected layer 130. In some embodiments, the display device 100 includes a touch panel 140, an optical material layer 160 and an external structure 170. The touch panel 140 can be disposed on the one side where relatively closer to the user, such as a superior surface (top surface) of the liquid crystal display module 150 in FIG. 1. The optical material layer 160 is disposed between the liquid crystal display module 150 and the light guide plate 120, which is configured to increase intensity and uniformity of light. The external structure 170 can be implemented by a shell of the display device 100, configured to assemble and contain components in the display device 100. In other embodiments of the present disclosure, the display device 100 may not include the touch panel 140. Therefore, it is not intended to limit the present disclosure. In some embodiments, a light guide plate module is composed of the light guide plate 120, the light source 110 and the reflected layer 130. The light guide plate module is disposed on one side (such as an underside in FIG. 1) of the liquid crystal display module 150, and the light guide plate module is used as a backlight of the liquid crystal display module 150.

Figure 2:
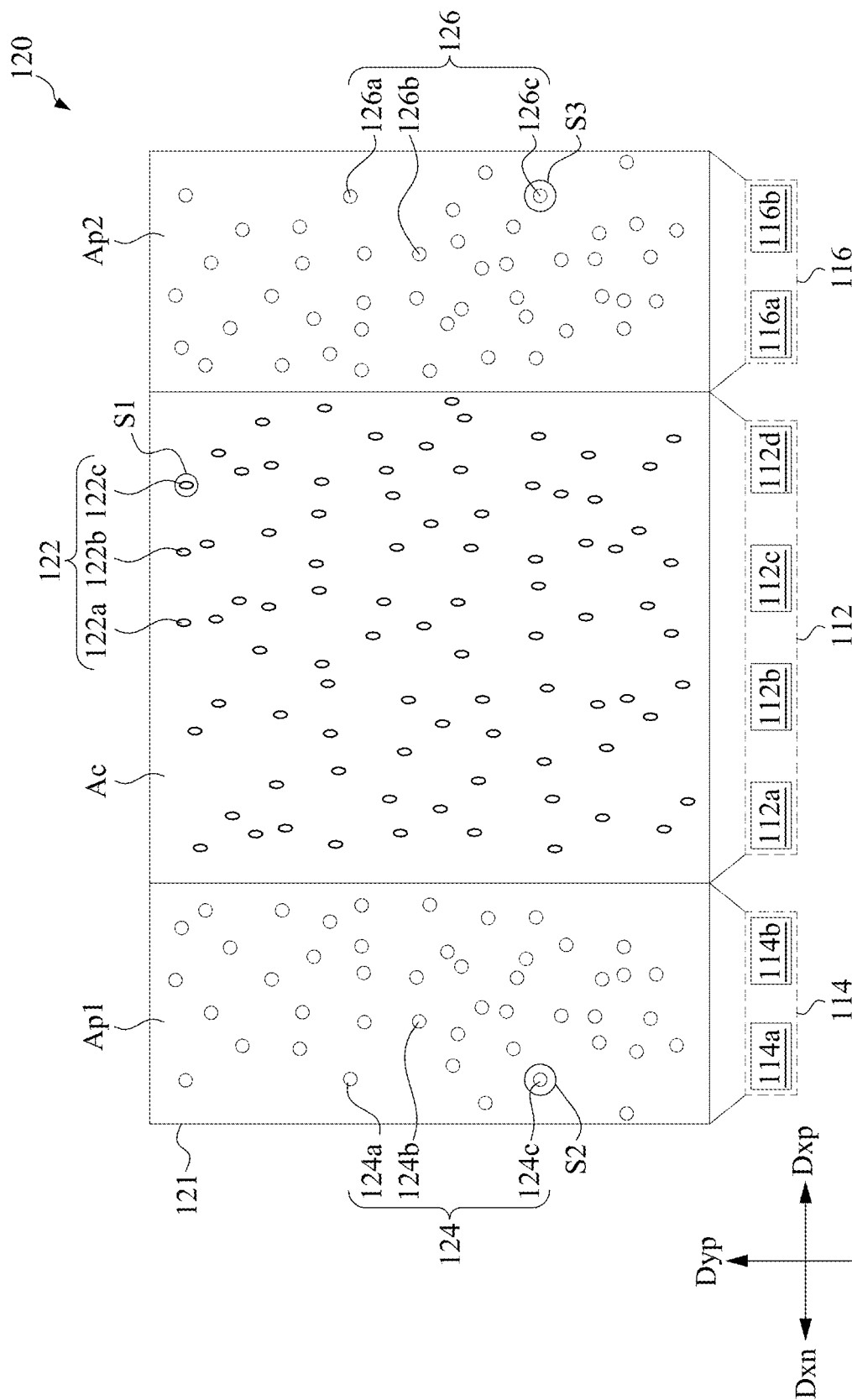
FIG. 2 is a top view of a light guide plate and light sources in accordance with one embodiment of the present disclosure.

A description is provided with reference to FIG. 2. FIG. 2 is a top view of a light guide plate 120 and light sources 112, 114 and 116 in accordance with one embodiment of the present disclosure. As shown in FIG. 2, the light guide plate 120 includes a substrate 121 and eccentric microstructures 122, 124 and 126 disposed in the substrate 121. To be specific, the eccentric microstructures 122, 124, and 126 are formed on a surface of the substrate 121.

In some embodiments, diameters of the eccentric microstructures 122, 124 and 126 fall within a range of 3-7 micrometers. In other embodiments, diameters of the eccentric microstructures 122, 124 and 126 fall within a range of 1 millimeter to 1 nanometer. In some embodiments, the light guide plate 120 has a central area Ac and peripheral areas Ap1 and Ap2. For example, the peripheral areas Ap1 and Ap2 are positioned at opposite sides along directions Dxn and Dxp with respect to the central area Ac. In the direction Dxn, the peripheral area Ap2, the central area Ac, and the peripheral area Ap1 are arranged in series. In the direction Dxp, the peripheral area Ap1, the central area Ac, and the peripheral area Ap2 are arranged in series. The direction Dxn is opposite to the direction Dxp. The substrate 121 is disposed on the central area Ac and the peripheral areas Ap1, Ap2. The eccentric microstructures 122 are disposed in the central area Ac of the light guide plate 120, and the eccentric microstructures 124 and 126 are disposed in the peripheral areas Ap1 and Ap2 respectively. Specifically, the eccentric microstructures 124a-124c are disposed in the peripheral area Ap1 of the light guide plate 120; the eccentric microstructures 126a-126c are disposed in the peripheral area Ap2 of the light guide plate 120.

The structures of eccentric microstructures 122 are different from the structures of the eccentric microstructures 124 and 126 which are disposed in the peripheral areas Ap1 and Ap2. And, the eccentric microstructures 124 and the eccentric microstructures 126 are symmetrical in the horizontal direction (such as, the direction Dxn and the direction Dxp). In other words, the eccentric microstructures 124 and the eccentric microstructures 126 are mirror symmetric with respect to an axis parallel the direction Dyn (or the direction Dyp).

The light sources 112, 114 and 116 are disposed on the same side/single side of the light guide plate 120. To be specific, the light sources 112, 114 and 116 are adjacent to the same side (edge) of the substrate 121 of the light guide plate 120. As a result, the light paths of the light sources 112, 114 and 116 transmitting through the light guide plate 120 along the same direction (such as, direction Dyp). In other words, the central area Ac and the peripheral areas Ap1 and Ap2 of the light guide plate 120 receive the lights along the same direction (such as, direction Dyn) from the light sources 112, 114 and 116 respectively.

On one side of the light guide plate 120, the light source 112 is disposed along an edge of the central area Ac, and the light source 112 is configured to provide a light to the central area Ac of the light guide plate 120, such that the eccentric microstructures 122 in the central area Ac can change the path of the light.

On the side of the light guide plate 120, the light source 114 is disposed along an edge of the peripheral area Ap1, and the light source 114 is configured to provide a light to the peripheral area Ap1 of the light guide plate 120 according to a display mode (e.g. wide-angle mode or privacy mode). Similarly, on the side of the light guide plate 120, the light source 116 is disposed along an edge of the peripheral area Ap2, and the light source 116 is configured to provide a light to the peripheral area Ap2 of the light guide plate according to a display mode (e.g. wide-angle mode or privacy mode). As a result, the eccentric microstructures 124 and 126 in the peripheral areas Apt and Ap2 can change the light paths of the lights from the light sources 114 and 116.

The light source 112 includes the light emitting elements 112a-112d. The light source 114 includes the light emitting elements 114a-114b. The light source 116 includes the light emitting elements 116a-116b. In some embodiments, the light emitting elements 112a-112d, the light emitting elements 114a-114b and the light emitting element 116a-116b can be implemented by light emitting diodes (LED), mini-light emitting diodes (mLED), laser diodes or other light emitting elements. Therefore, it is not intended to limit the present disclosure.

Figure 3B:
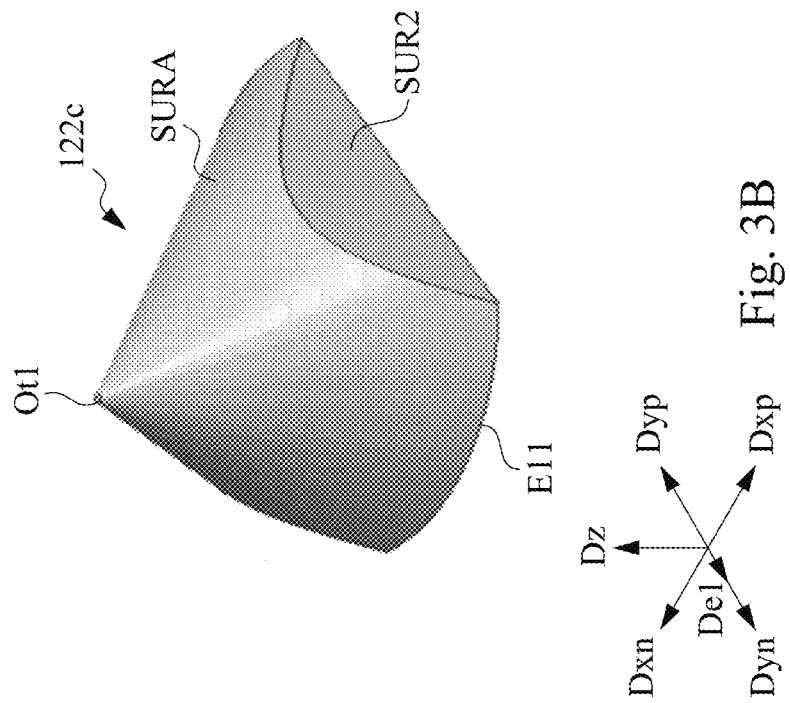
FIGS. 3A and 3B are perspective views of an eccentric microstructure in accordance with one embodiment of the present disclosure.
Figure 3A:
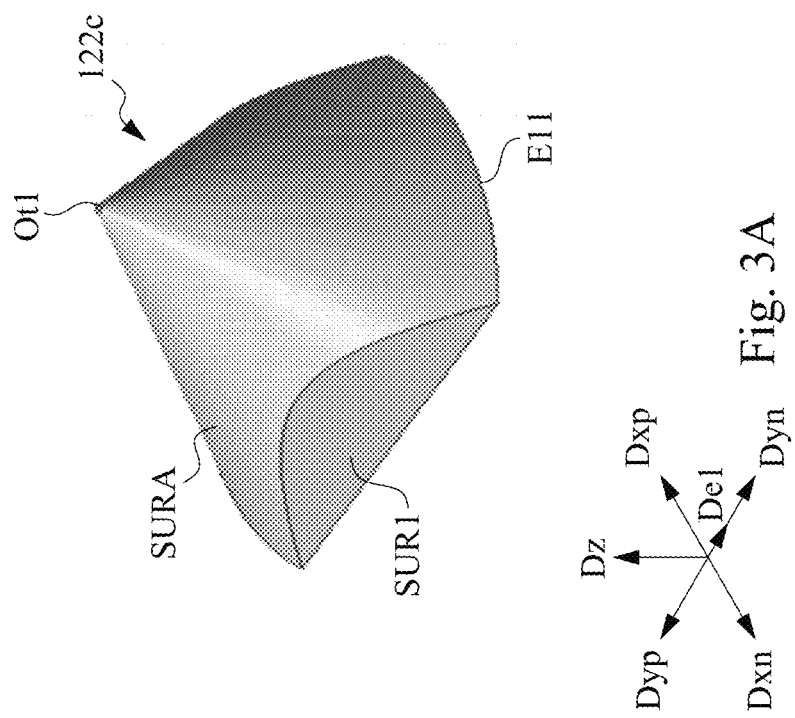

A description is provided with reference to FIGS. 3A and 3B. FIGS. 3A and 3B are perspective views of an eccentric microstructure 122c in accordance with one embodiment of the present disclosure. Each of the eccentric microstructures 122 in FIG. 2 can be implemented by the eccentric microstructure 122c in FIGS. 3A and 3B.

As shown in FIGS. 3A and 3B, the eccentric microstructure 122c is composed of a part of an eccentric cone structure. In other words, the eccentric microstructure 122c includes a curved surface SURA. The curved surface SURA includes a conical point Ot1 and a cutting edge E11, and the cutting edge E11 located at a surface (e.g., bottom surface) of the substrate 121 of the light guide plate 120. In other words, part of the curved surface SURA connects the surface of the substrate 121 through the cutting edge. The eccentric microstructure 122c further includes at least one vertical cutting surface (e.g. the vertical cutting surfaces SUR1 and SUR2) along a vertical direction (e.g., direction Dz). The direction Dz is parallel to normal of the surface of the substrate. And, the vertical cutting surfaces SUR1 and SUR2 are parallel to the directions Dyp and Dyn. In other words, the vertical cutting surfaces SUR1 and SUR2 of the eccentric microstructure 122c are parallel to the optical paths from the light sources 112, 114 and 116 to the light guide plate 120. In other words, the directions Dyp, Dyn, Dz form the vertical cutting surfaces SUR1 and SUR2, and the vertical cutting surfaces SUR1 and SUR2 form cliff structures in the eccentric microstructure 122c.

Figure 4B:
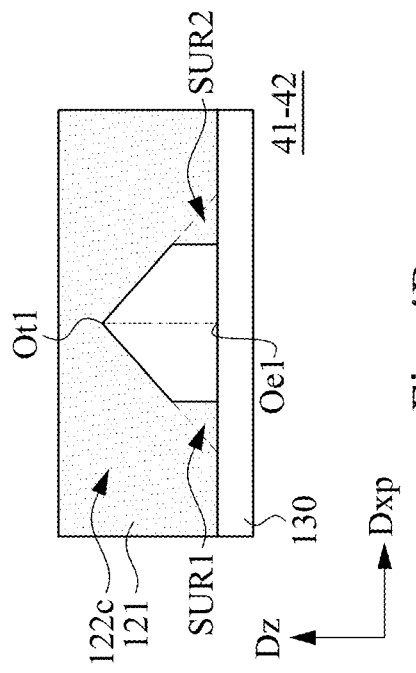
FIG. 4B is a sectional view of the light guide plate according to a cutting plane line 41-42 in FIG. 4A in accordance with one embodiment of the present disclosure.
Figure 4C:
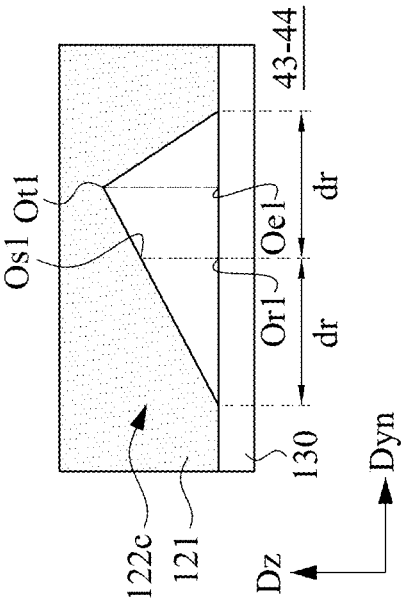
FIG. 4C is a sectional view of the light guide plate according to a cutting plane line 43-44 in FIG. 4A in accordance with one embodiment of the present disclosure.
Figure 4A:
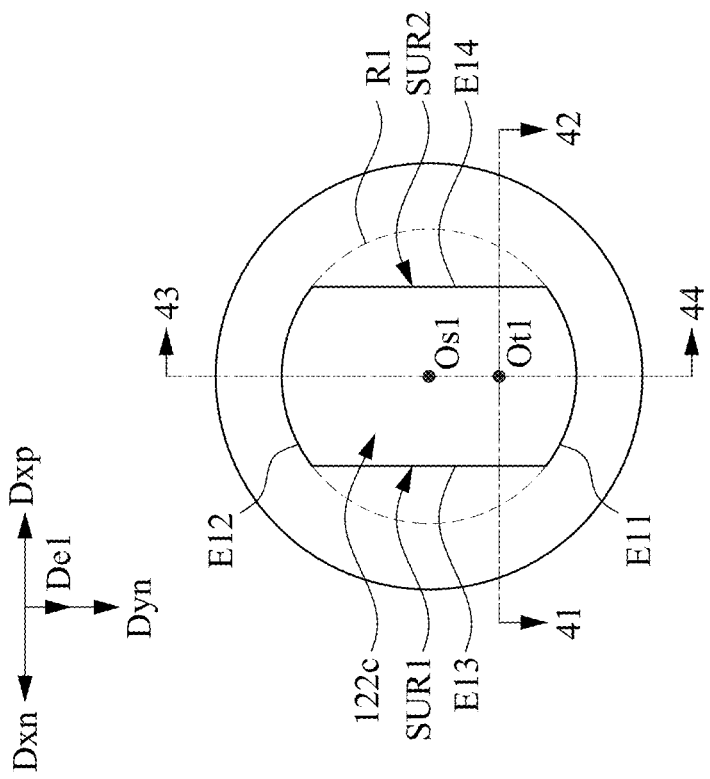
FIG. 4A is an enlarged view of an eccentric microstructure in the light guide plate in FIG. 2 in accordance with one embodiment of the present disclosure.

A description is provided with reference to FIG. 4A. FIG. 4A is an enlarged view of an eccentric microstructure 122c in the light guide plate 120 in FIG. 2 in accordance with one embodiment of the present disclosure. To be specific, FIG. 4A is an enlarged view according to area S1 in FIG. 2. As shown in FIG. 4A, the cutting edges E11 and E12 of the eccentric microstructure 122c is designed according to a reference line R1. In the top view of the eccentric microstructure 122c, the reference line R1 form a circle, and the cutting edges E11 and E12 occupy parts of the circle. To reduce the light beam angle with a range of rotating toward the directions Dxp and Dxn, a sum of the cutting edges E11 and E12 of the eccentric microstructure 122c is ½ times of the length of the reference line R1. Therefore, the range of the light beam angle of rotating toward the directions Dxp and Dxn can be reduced by the eccentric microstructure 122c. In other words, length of the sum of the cutting edges E11 and E12 and length of the rest of reference line R1 are similar or the same. While the rest of reference line R1 is protrude towards the directions Dxp and Dxn in the top view, the eccentric microstructure 122c may reduce the light propagate towards the directions Dxn and Dxp.

A description is provided with reference to FIGS. 4A, 4B and 4C. FIG. 4B is a sectional view of the area S1 in the light guide plate 120 along a cutting plane line 41-42 in FIG. 4A in accordance with one embodiment of the present disclosure. FIG. 4C is a sectional view of the area S1 in the light guide plate 120 along a cutting plane line 43-44 in FIG. 4A in accordance with one embodiment of the present disclosure.

As shown in FIG. 4B, the eccentric microstructure 122c can be embedded in or recessed into the surface of the substrate 121 (e.g., the bottom surface), and the eccentric microstructure 122c can be a hollow structure. In other embodiments, the eccentric microstructure 122c can be filled with other materials. And, the reflected layer 130 is disposed adjacent to the light guide plate 120. To be specific, the reflected layer 130 is disposed adjacent to the bottom surface of the substrate 121.

The eccentric microstructure 122c comprises an eccentric orientation De1, the eccentric orientation De1 extends from a central point Or1 of the cutting edges E11-E14 on the bottom of the eccentric microstructure 122c to a projection Oe1 of the conical point Ot1 on a horizontal plane. A direction extends from the central point Or1 to the projection Oe1 and the eccentric orientation De1 are the same. The central point Or1 is a center of the reference line R1, and which is a projection of the point Os1 of the curved surface SURA on the horizontal plane. In other words, while the reference line R1 form a circle in the top view, the central point Or1 is centre of the circle. And, the eccentric orientation De1 is parallel to the direction Dyn.

As shown in FIGS. 4A and 4C, the cutting edges E11 and E12 on the bottom of the eccentric microstructure 122c is composed of a part of the reference line R1 with a radius dr, and a projection of the conical point Ot1 of the eccentric microstructure 122c on the horizontal plane is the point Oe1 deviated from the central point Or1 of the reference line R1 along the eccentric orientation De1. And the eccentric orientation De1 is opposite to an optical axis of the light source 112. Since the eccentric orientation De1 is opposite to the light transmitting path of the light source 112, the eccentric microstructure 122c is able to change the light path of the light to the direction Dz, and the direction Dz can be considered as an optical axis of the eccentric microstructure 122c. How to change the light path of the light by the eccentric microstructure 122c will be discussed in detailed in the following embodiments.

Figure 5:
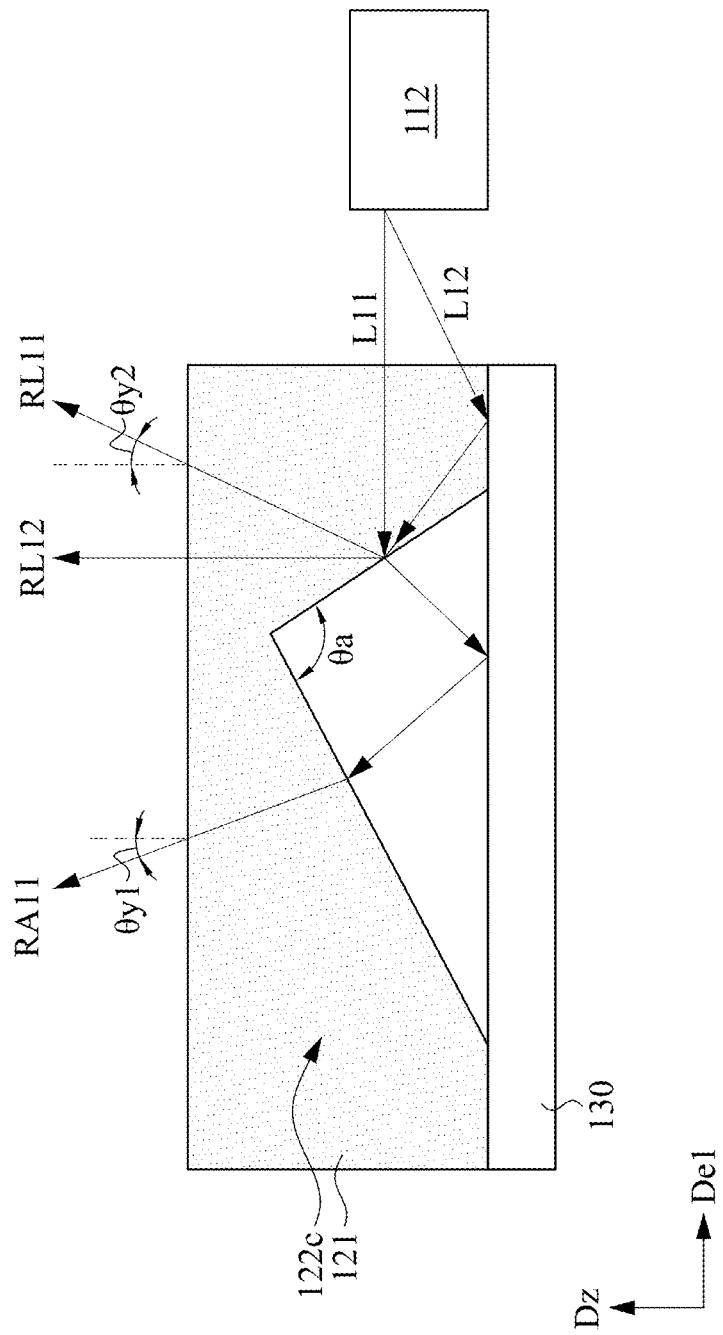
FIG. 5 is a schematic diagram of light paths of an eccentric microstructure in accordance with one embodiment of the present disclosure.

A description is provided with reference to FIG. 5. FIG. 5 is a schematic diagram of light paths of an eccentric microstructure 122c in accordance with one embodiment of the present disclosure.

As shown in FIG. 5, the light source 112 generated lights L11 and L12. Referring to the light L11. When the light L11 is incident on the eccentric microstructure 122c, a reflected light RL11 is generated. An angle between the reflected light RL11 and a vertical direction (e.g., the direction Dz) can be represented as $\theta_{y2}$. And, when the light L11 incident to the eccentric microstructure 122c, refraction of the light L11 occurs on the eccentric microstructure 122c, and then reflection of the refracted light occurs on the reflected layer 130, and the reflected light refracted through the eccentric microstructure 122c generates a refracted light RA11. An angle between the refracted light RA11 and the vertical direction (e.g., the direction Dz) can be represented as $\theta_{y1}$. As a result, the eccentric microstructure 122c can change the incident path of the light L11 along the direction Dyp towards the direction Dz within a range of angle $\theta_{y1}$ to $\theta_{y2}$.

On the other hand, a reflection of the light L12 occurs on the reflected layer 130 first, and then a reflection of the reflected light occurs on the eccentric microstructure 122c to generate the reflected light RL12. A main direction of the light beam angle of the reflected light RL12 is substantially equal to the direction Dz.

As a result, the eccentric microstructure 122c can transmit the lights L11 and L12 to a range of front view (e.g., the range of rotating angle $\theta_{y1}$ toward directions Dyp from the direction Dz and rotating angle $\theta_{y2}$ toward directions Dyn from the direction Dz). In other words, the light guide structure 120 can provide light that emits from the top surface of the substrate 121 after being reflected or refracted by the eccentric microstructure 122c.

And, since the eccentric microstructure 122c includes the vertical cutting surfaces SUR1 and SUR2, the range of the light beam angle of respectively rotating an angle toward the directions Dxp and Dxn from the direction Dz is reduced, and the rotation angle is less than 45 degrees.

In some embodiments, an angle $\theta_a$ of the eccentric microstructure 122c can be 60 to 120 degrees. The angle $\theta_a$ is a vertical projection of the conical point of the eccentric microstructure 122c.

Figure 6:
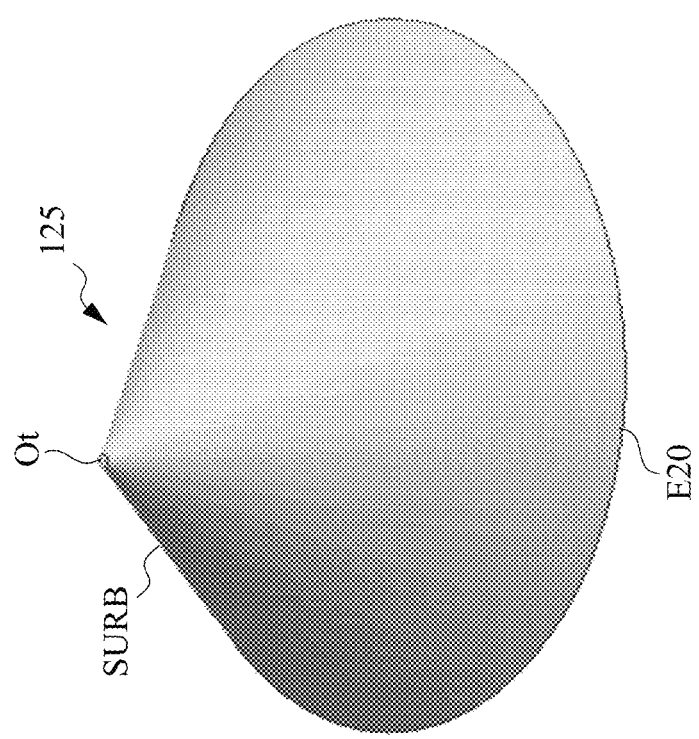
FIG. 6 is a perspective view of an eccentric microstructure in accordance with one embodiment of the present disclosure.

A description is provided with reference to FIG. 6. FIG. 6 is a perspective view of an eccentric microstructure 125 in accordance with one embodiment of the present disclosure. As shown in FIG. 6, the eccentric microstructure 125 includes a conical point Ot, a curved surface SURB and a cutting edge E20. Each of the eccentric microstructures 124 and 126 disposed in the peripheral areas Ap1 and Ap2 as shown in FIG. 2 can be implemented by the eccentric microstructure 125.

Figure 7B:
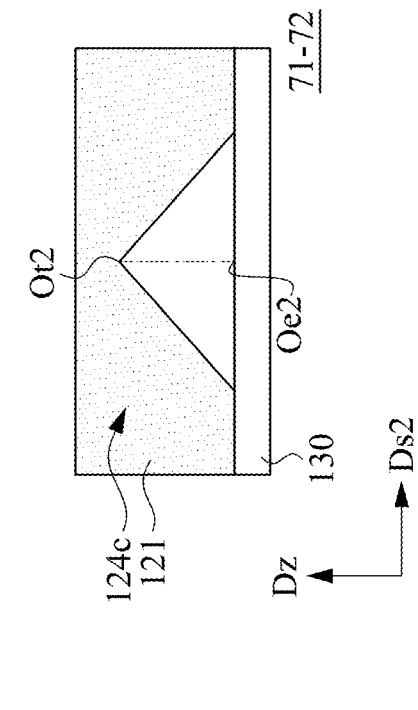
FIG. 7B is a sectional view of the light guide plate according to a cutting plane line 71-72 in FIG. 7A in accordance with one embodiment of the present disclosure.
Figure 7C:
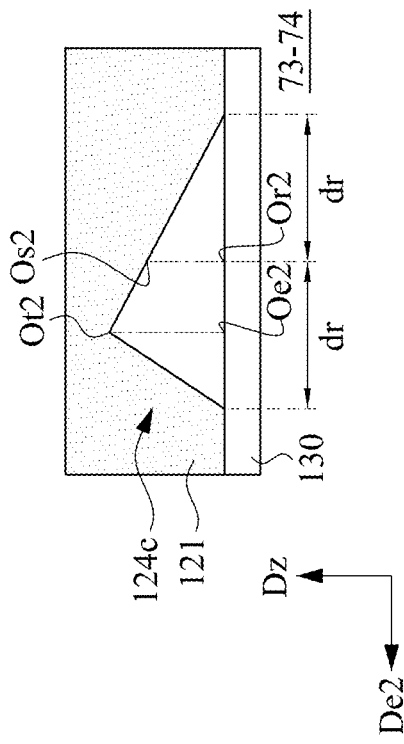
FIG. 7C is a sectional view of the light guide plate according to a cutting plane line 73-74 in FIG. 7A in accordance with one embodiment of the present disclosure.
Figure 7A:
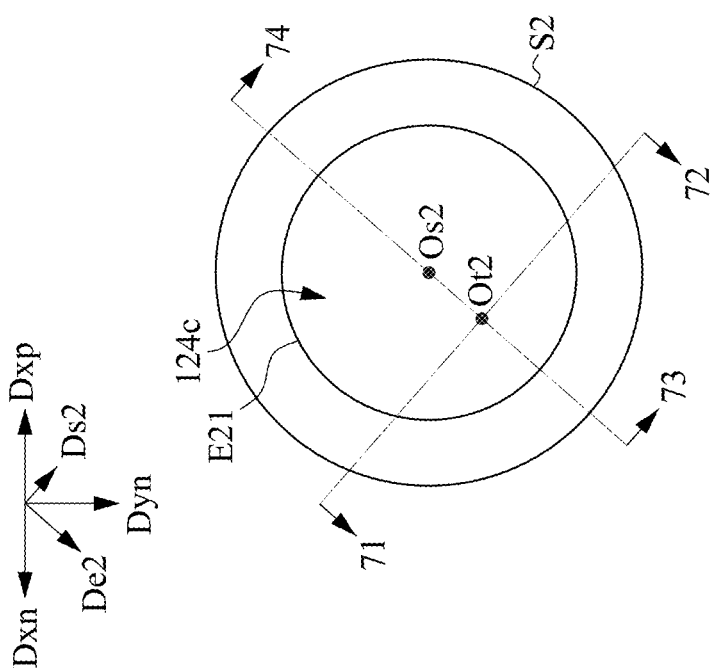
FIG. 7A is an enlarged view of an eccentric microstructure in the light guide plate in FIG. 2 in accordance with one embodiment of the present disclosure.

A description is provided with reference to FIGS. 7A, 7B and 7C. FIG. 7A is an enlarged view of an eccentric microstructure 124c according to an area S2 of the light guide plate 120 in FIG. 2 in accordance with one embodiment of the present disclosure. FIG. 7B is a sectional view of the light guide plate 120 according to a cutting plane line 71-72 in FIG. 7A in accordance with one embodiment of the present disclosure. FIG. 7C is a sectional view of the light guide plate 120 according to a cutting plane line 73-74 in FIG. 7A in accordance with one embodiment of the present disclosure. As shown in FIG. 7A, the cutting plane line 71-72 extends along a direction Ds2, and the cutting plane line 73-74 extends along a direction De2.

A shown in FIG. 7B, the eccentric microstructure 124c can be embedded in or recessed into the surface of the substrate 121 (e.g., the bottom surface), and the eccentric microstructure 124c can be a hollow structure. In other embodiments, the eccentric microstructure 124c can be filled with other material. And, the reflected layer 130 is disposed adjacent to the light guide plate 120. To be specific, the reflected layer 130 is disposed adjacent to the bottom surface of the substrate 121. To be noted that, each of the eccentric microstructures 124 in FIG. 2 can be implemented by the eccentric microstructure 124c.

The eccentric microstructure 124c comprises an eccentric orientation De2, the eccentric orientation De2 extends from a central point Or2 of the cutting edge E21 on the bottom of the eccentric microstructure 124c to a projection Oe2 of the conical point Ot2 on a horizontal plane. The central point Or2 is a projection of the point Os2 of the curved surface SURB on the horizontal plane. A direction extends from the central point Or2 to the projection Oe2 and the eccentric orientation De2 are the same. And, the eccentric orientation De2 is between the directions Dxn and Dyn in the horizontal plane. An angle between the eccentric orientation De2 and the eccentric orientation De1 is less than 90 degrees.

As shown in FIGS. 7A and 7C, the cutting edge E21 on the bottom of the eccentric microstructure 124c is composed of a circle with a radius dr, and a projection of the conical point Ot2 of the eccentric microstructure 124c deviated on the horizontal plane is the point Oe2, which is deviated from the central point Or2 along the eccentric orientation De2. Since there is an angle between the eccentric orientation De2 and the light path of the light source 114, the eccentric microstructure 124c is able to transmit the light along the direction Dz with a light beam angle, and a range of the light beam angle of rotating toward the direction Dxn from the direction Dz can be increased by the eccentric microstructure 124c.

Figure 8B:
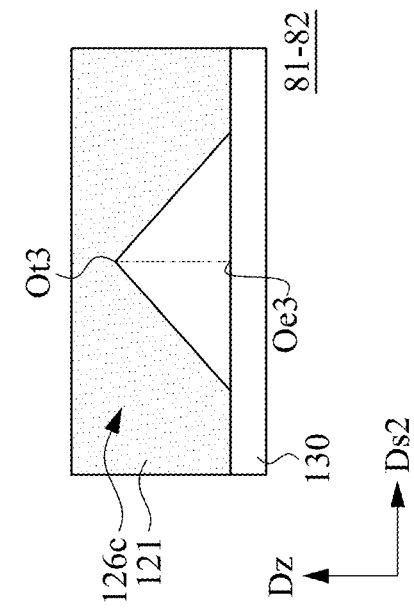
FIG. 8B is a sectional view of the light guide plate according to a cutting plane line 81-82 in FIG. 8A in accordance with one embodiment of the present disclosure.
Figure 8C:
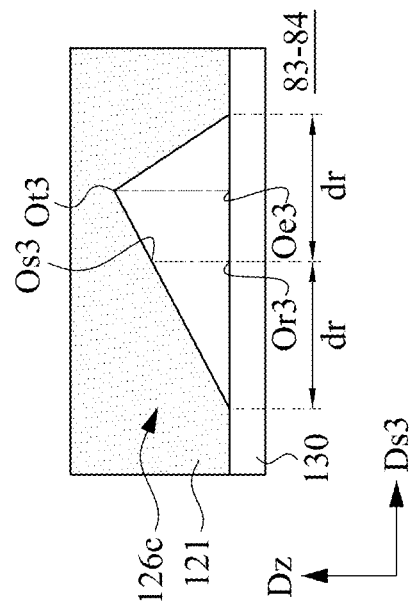
FIG. 8C is a sectional view of the light guide plate according to a cutting plane line 83-84 in FIG. 8A in accordance with one embodiment of the present disclosure.
Figure 8A:
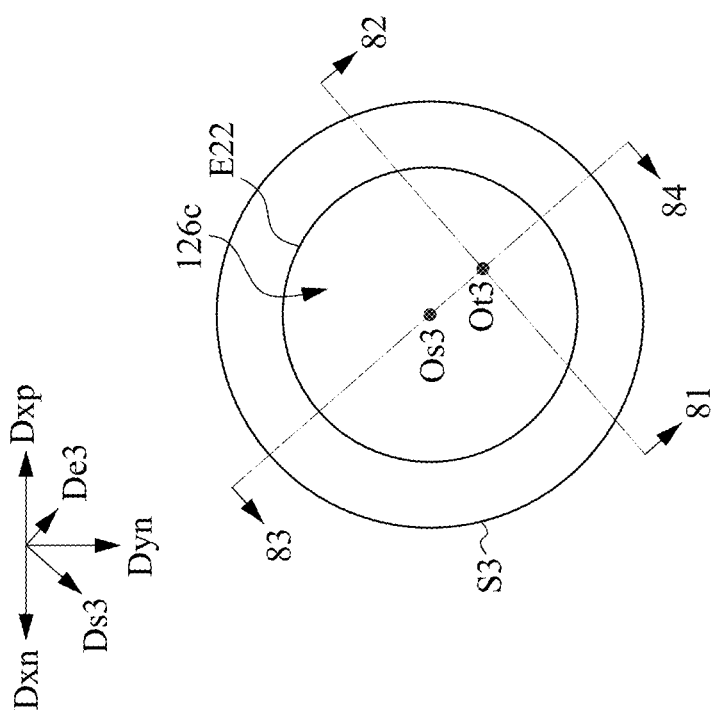
FIG. 8A is an enlarged view of an eccentric microstructure in the light guide plate in FIG. 2 in accordance with one embodiment of the present disclosure.

A description is provided with reference to FIGS. 8A, 8B and 8C. FIG. 8A is an enlarged view of an eccentric microstructure 126c according to an area S3 of the light guide plate 120 in FIG. 2 in accordance with one embodiment of the present disclosure. FIG. 8B is a sectional view of the light guide plate 120 according to a cutting plane line 81-82 in FIG. 8A in accordance with one embodiment of the present disclosure. FIG. 8C is a sectional view of the light guide plate 120 according to a cutting plane line 83-84 in FIG. 8A in accordance with one embodiment of the present disclosure. As shown in FIG. 8A, the cutting plane line 81-82 extends along a direction Ds3, and the cutting plane line 83-84 extends along a direction De3.

As shown in FIG. 8B, the eccentric microstructure 126c can be embedded in or recessed into the surface of the substrate 121 (e.g., the bottom surface), and the eccentric microstructure 126c can be a hollow structure. In other embodiments, the eccentric microstructure 126c can be filled with other material. And, the reflected layer 130 is disposed adjacent to the light guide plate 120. To be specific, the reflected layer 130 is disposed adjacent to the bottom surface of the substrate 121. To be noted that, each of the eccentric microstructures 126 in FIG. 2 can be implemented by the eccentric microstructure 126c.

The eccentric microstructure 126c comprises the eccentric orientation De3, the eccentric orientation De3 extends from a central point Or3 of the cutting edge E22 on the bottom of the eccentric microstructure 126c to a projection Oe3 of the conical point Ot3 on a horizontal plane. The central point Or3 is a projection of the point Os3 of the curved surface SURB on the horizontal plane. A direction extends from the central point Or3 to the projection Oe3 and the eccentric orientation De3 are the same. And, the eccentric orientation De3 is included in an included angle between directions Dxn and Dyn. An angle of between the eccentric direction De3 and the eccentric direction De1 is less than 90 degrees.

As shown in FIGS. 8A and 8C, the cutting edge E22 on the bottom of the eccentric microstructure 126c is composed of a circle with a radius dr, and a projection of the conical point Ot3 of the eccentric microstructure 126c on the horizontal plane is the point Oe3 deviated from the central point Or3 along the eccentric orientation De3. Since there is an angle between the eccentric orientation De3 and the light path of the light source 116, the eccentric microstructure 126c is able to transmit the light along the direction Dz with a light beam angle, and a range of the light beam angle of rotating toward the direction Dxp from the direction Dz can be increased by the eccentric microstructure 126c.

Overall, it can be understood from the abovementioned embodiments in FIGS. 4A, 7A and 8A, the eccentric orientation De1 of the eccentric microstructure 122c is opposite with the optical axis (transmitting direction) of the light source 112, and the eccentric orientation De2 of the eccentric microstructure 124c and the eccentric orientation De3 of the eccentric microstructure 126c are mirror symmetric with respect to the optical axis of the light source 112.

A description is provided with reference to FIGS. 2 and 9. FIG. 9 is a schematic diagram of eccentric microstructures 122c, 124c and 126c in FIG. 2 in accordance with one embodiment of the present disclosure. As shown in FIG. 9, the eccentric microstructure 122c in the area S1 change a propagation direction of a light from the light source 112 to a front view direction, the eccentric microstructure 124c in the area S2 changes a propagation direction of a light from the light source 114 to a left side view direction, and the eccentric microstructure 126c in the area S3 change a propagation direction of a light from the light source 116 to a right side view direction.

Specifically, the light source 112 generate a light beam to the eccentric microstructures 122, and the eccentric microstructures 122 reflect/refract the light beam to generate reflected/refracted light with a light beam angle (the light beam angle, such as, a range of rotating 45 degrees toward the directions Dxp from the direction Dz and rotating 45 degrees toward the directions Dxn from the direction Dz).

The light source 114 generates a light beam to the eccentric microstructures 124, and the eccentric microstructures 124 reflect/refract the light beam to generate reflected/refracted light with a light beam angle (the light beam angle, such as, a range of rotating 45 degrees toward the direction Dxn from the direction Dz). The light beam angle of the reflected/refracted light from the eccentric microstructures 124 and the light beam angle of the reflected/refracted light from the eccentric microstructure 122 are different.

The light source 116 generates a light beam to the eccentric microstructures 126, and the eccentric microstructures 126 reflect/refract the light beam to generate reflected/refracted light with a light beam angle (the light beam angle, such as, a range of rotating 45 degrees toward the direction Dxp form the direction Dz). In some embodiments, the light beam angles from the eccentric microstructures 122, 124 and 126 are different from each other.

As a result, in a wide-view mode, the intensity of lights from the light sources 112, 114 and 116 can be adjusted to the same or the maximum brightness, such that the eccentric microstructures 124 and 126 in the peripheral areas Ap1 and Ap2 of the light guide plate 120 respectively provide lights for left and right view, and the eccentric microstructures 122 in the central area Ac of the light guide plate 120 provide a light for front view. On the other hand, in a privacy mode, the intensity of the light generated from the light source 112 can be maintained, and the intensity of the lights generated from the light sources 114 and 116 can be decreased or can directly turn off the light sources 114 and 116, such that lights transmitted from the eccentric microstructures 124 and 126 in the peripheral areas Ap1 and Ap2 of the light guide plate 120 for left and right view can be decreased, or the lights provided for left and right view can be directly turn off, and the eccentric microstructures 122 in the central area Ac of the light guide plate 120 are still provide the lights for front view.

For example, in the wide-view mode, the light source 112 generates lights with a first intensity (such as, 100% of maximum intensity), and the light sources 114 and 116 generate lights with the first intensity (such as, 100% of maximum intensity). In the privacy mode, the light source 112 generates lights with the first intensity (such as, 100% of maximum intensity), and the light sources 114 and 116 generate lights with a second intensity (such as, 50% of maximum intensity). In other words, in the privacy mode, the intensity value of the lights generated by the light sources 114 and 116 can be adjusted to less than the intensity value of the lights generated by the light source 112, so as to decrease light beam angle for the side view, and to achieve privacy protection.

Figure 10:
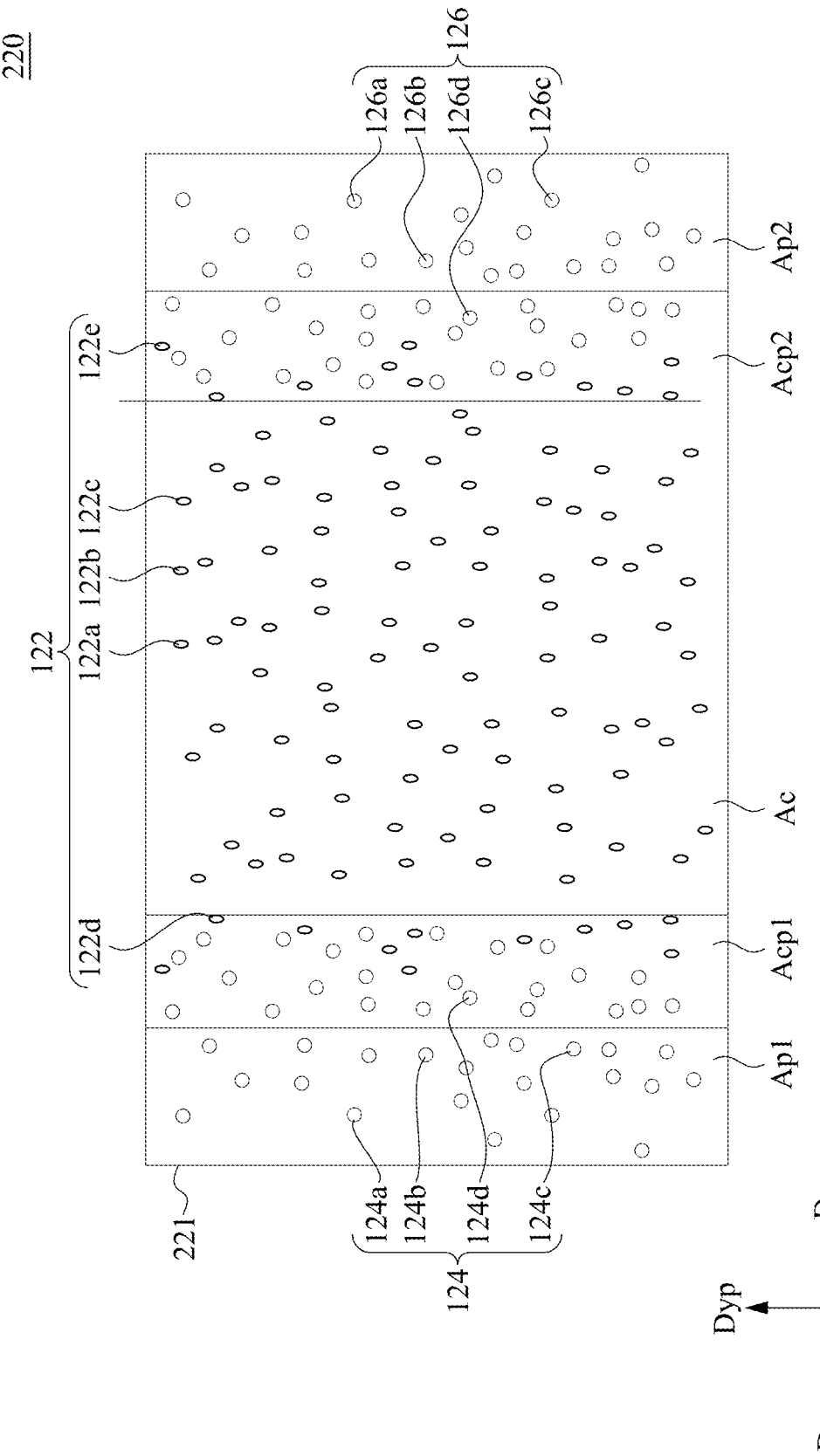
FIG. 10 is a top view of a light guide plate in accordance with the other embodiment of the present disclosure.

A description is provided with reference to FIG. 10. FIG. 10 is a schematic diagram of a light guide plate 220 in accordance with the other embodiment of the present disclosure. As shown in FIG. 10, the light guide plate 220 includes a substrate 221 and eccentric microstructures 122, 124 and 126.

Compare to the light guide plate 120 as shown in FIG. 2, different of the light guide plate 220 in FIG. 10 is that, mixed areas can be further disposed between the central area Ac and the peripheral areas Ap1 and Ap2, such as, areas Acp1 and Acp2 of the light guide plate 120.

For example, the eccentric microstructure 122d and the eccentric microstructure 124d are disposed in the area Acp1 of the light guide plate 120, and the eccentric microstructure 122e and the eccentric microstructure 126d are disposed in the area Acp2. The functions and structures of the eccentric microstructures 122, 124 and 126 in FIG. 10 are respectively similar to the eccentric microstructures 122, 124 and 126 in FIG. 2. Therefore, the descriptions are omitted. The design of the areas Acp1 and Acp2 is transition area, and the overall visual has a relatively smooth and harmonic change.

Summary, in the present disclosure, the eccentric microstructures 124 of the light guide plate 120 are able to change the direction of the light from the light source 114 to the left side of the front view, the eccentric microstructures 126 of the light guide plate 120 are able to change the direction of the light from the light source 116 to the right side of the front view, and the eccentric microstructures 122 are able to reduce light beam angle of the light from right and left sides of the front view, and the light intensity of the lights emitted by each light sources 112, 114 and 116 can be controlled to provide the wide-view mode or the privacy mode. Furthermore, the angles between the eccentric direction De1 of the eccentric microstructures 122 and the eccentric directions De2 and De3 are less than 90 degrees, such that the light sources 112, 114 and 116 can be disposed on the same side of the light guide plate 120, in order to reduce the volume of the backlight module.

Although specific embodiments of the disclosure have been disclosed with reference to the above embodiments, these embodiments are not intended to limit the disclosure. Various alterations and modifications may be performed on the disclosure by those of ordinary skills in the art without departing from the principle and spirit of the disclosure. Thus, the protective scope of the disclosure shall be defined by the appended claims.

What is claimed is:

1. A light guide plate, comprising:
   a first area;
   a second area, located on at least one side of the first area;
   a substrate;
   a plurality of first eccentric microstructures, disposed in the substrate, and located at the first area, wherein each of the first eccentric microstructures comprises a first eccentric orientation; and
   a plurality of second eccentric microstructures, disposed in the substrate, and located at the second area, wherein each of the second eccentric microstructures comprises a second eccentric orientation, and wherein an angle between the first eccentric orientation and the second eccentric orientation is less than 90 degrees, wherein each of the first eccentric microstructures comprises:
      a curved surface, with a conical point and a cutting edge positioned at a surface of the substrate, wherein the first eccentric orientation is a direction from a central point of the cutting edge to a projection of the conical point to the surface; and
      at least one vertical cutting surface, wherein the at least one vertical cutting surface is parallel to the first eccentric orientation.

2. A display device, comprising:
a light guide plate, comprising a first area and a second area located on at least one side of the first area, wherein the light guide plate comprising:
   a substrate;
   a plurality of first eccentric microstructures, disposed in the substrate, and located at the first area, wherein each of the first eccentric microstructures comprises a first eccentric orientation; and
   a plurality of second eccentric microstructures, disposed in the substrate, and located at the second area, wherein each of the second eccentric microstructures comprises a second eccentric orientation,
wherein the first eccentric orientation is different from the second eccentric orientation,
wherein an angle between the first eccentric orientation and the second eccentric orientation is less than 90 degrees;
wherein each of the first eccentric microstructures comprises:
   a curved surface, with a conical point and a cutting edge positioned at a surface of the substrate, wherein the first eccentric orientation is a direction from a central point of the cutting edge to a projection of the conical point to the surface; and
   at least one vertical cutting surface, wherein the at least one vertical cutting surface is parallel to the first eccentric orientation.

3. The display device of claim 1, further comprising:
a first light source, configured to generate a first light with a first intensity to the first eccentric microstructures in a first mode and a second mode, wherein the first eccentric microstructures reflect the first light to generate a first reflected light at a first light beam angle; and
a second light source, configured to generate a second light with the first intensity to the second eccentric microstructures in the first mode and to generate the second light with a second intensity to the second eccentric microstructures in the second mode, wherein a value of the second intensity is less than a value of the first intensity, wherein the second eccentric microstructures reflect the second light to generate a second reflected light at a second light beam angle, wherein the first light source and the second light source are disposed on same side of the light guide plate.

4. The display device of claim 1, further comprising:
a first light source, configure to generate a first light to the first eccentric microstructures, wherein the first eccentric microstructures reflect the first light to generate a first reflected light at a first light beam angle; and
a second light source, configure to generate a second light to the second eccentric microstructures, wherein the second eccentric microstructures reflect the second light to generate a second reflected light at a second light beam angle, wherein,
the first light source and the second light source are disposed on same side of the light guide plate.

5. The display device of claim 4, wherein the first eccentric orientation is opposite with a transmitting direction of the first light source.

6. The display device of claim 4, wherein the first light beam angle is different from the second light beam angle.

7. The display device of claim 4, wherein the light guide plate is further comprising:
a plurality of third eccentric microstructures, disposed in the substrate, and are located at a third area of the light guide plate, wherein the third eccentric microstructures have a third eccentric orientation, and the first eccentric orientation, the second eccentric orientation and the third eccentric orientation are different from each other, and the display device comprises:
a third light source, configured to generate a third light to the third eccentric microstructures, wherein the third eccentric microstructures reflect the third light to generate a third reflected light at a third light beam angle,
wherein the first light source, the second light source and the third light source are disposed on same side of the light guide plate.

8. The display device of claim 7, wherein the first area includes a central area of the light guide plate, and the second area and the third area are respectively located at opposite sides of the central area, and the second area and the third area are adjacent to the central area.

9. The display device of claim 8, wherein the first eccentric orientation is a direction opposite to a transmitting direction of the first light source, and the second eccentric orientation and the third eccentric orientation are mirror symmetric with respect to the optical axis of the first light source.

* * * * *